(12) United States Patent
Bantle

(10) Patent No.: US 12,539,640 B2
(45) Date of Patent: Feb. 3, 2026

(54) HAND-HELD POWER TOOL HAVING A HEIGHT ADJUSTMENT DEVICE

(71) Applicant: Robert Bosch GmbH, Stuttgart (DE)

(72) Inventor: Florian Bantle, Westerheim (DE)

(73) Assignee: Robert Bosch GmbH, Stuttgart (DE)

( * ) Notice: Subject to any disclaimer, the term of this patent is extended or adjusted under 35 U.S.C. 154(b) by 589 days.

(21) Appl. No.: 17/999,449

(22) PCT Filed: May 12, 2021

(86) PCT No.: PCT/EP2021/062664
§ 371 (c)(1),
(2) Date: Nov. 21, 2022

(87) PCT Pub. No.: WO2021/239469
PCT Pub. Date: Dec. 2, 2021

(65) Prior Publication Data
US 2023/0202068 A1      Jun. 29, 2023

(30) Foreign Application Priority Data
May 25, 2020   (DE) .................... 10 2020 206 445.8

(51) Int. Cl.
*B27C 5/10*      (2006.01)
*B23C 1/20*      (2006.01)
*B25F 5/00*      (2006.01)

(52) U.S. Cl.
CPC ............... *B27C 5/10* (2013.01); *B25F 5/003* (2013.01); *B23C 1/20* (2013.01); *B23C 2255/08* (2013.01);
(Continued)

(58) Field of Classification Search
CPC ......... B27C 5/10; B23C 1/20; B23C 2260/48; Y10T 409/306216–306608;
(Continued)

(56) References Cited

U.S. PATENT DOCUMENTS 6,510,878 B1 *   1/2003   Cavit .................. B23Q 9/0028
                                                        144/136.95
7,260,897 B1     8/2007   Neff
(Continued)

FOREIGN PATENT DOCUMENTS

DE     10 2017 203 284 A1     9/2018
DE        102021131074 A1 *   6/2023
EP          3 369 539 A1      9/2018

OTHER PUBLICATIONS

Machine Translation of EP 3369539 A1, which EP '539 was published Sep. 5, 2018.*
(Continued)

*Primary Examiner* — Erica E Cadugan
(74) *Attorney, Agent, or Firm* — Maginot, Moore & Beck LLP

(57) ABSTRACT

A hand-held power tool, more particularly a router, includes (i) a housing in which a drive unit for driving an insertion tool is disposed; (ii) a base plate for guiding the hand-held power tool on a workpiece surface, the base plate being height-adjustable on the housing, and the base plate having an opening, through which the insertion tool at least partly extends; and (iii) a height adjustment device for setting a working height of the base plate on the housing relative to the insertion tool. A setting aid is provided which allows height adjustment of a bottom of the base plate by way of the height adjustment device such that said bottom is flush with a predefined cutting edge of the insertion tool.

6 Claims, 5 Drawing Sheets

(52) U.S. Cl.
CPC . *B23C 2255/12* (2013.01); *Y10T 409/306608* (2015.01); *Y10T 409/308176* (2015.01)

(58) Field of Classification Search
CPC ..... Y10T 409/308176; Y10T 409/3084; Y10T 409/308624; B23Q 5/52; B23Q 3/18; B23Q 3/186; B23Q 17/22–17/2291; B25F 5/003; B25F 5/021; B27G 23/00
USPC ...... 409/175–182, 210, 214, 218; 144/154.5, 144/136.95; 33/638, 640–642
See application file for complete search history.

(56) References Cited

U.S. PATENT DOCUMENTS

| | | | |
|---|---|---|---|
| 7,448,419 B1 * | 11/2008 | Sommerfeld | B27C 5/10 409/182 |
| 7,677,280 B2 | 3/2010 | McDonald et al. | |
| 8,545,143 B2 * | 10/2013 | Liu | B27C 5/10 409/182 |

OTHER PUBLICATIONS

International Search Report corresponding to PCT Application No. PCT/EP2021/062664, mailed Jul. 21, 2021 (German and English language document) (5 pages).

\* cited by examiner

HAND-HELD POWER TOOL HAVING A HEIGHT ADJUSTMENT DEVICE

This application is a 35 U.S.C. § 371 National Stage Application of PCT/EP2021/062664, filed on May 12, 2021, which claims the benefit of priority to Serial No. DE 10 2020 206 445.8, filed on May 25, 2020 in Germany, the disclosures of which are incorporated herein by reference in their entirety.

BACKGROUND

The present disclosure relates to a hand-held power tool, in particular a router, comprising a housing in which a drive unit for driving an insertion tool is arranged, comprising a base plate for guiding the hand-held power tool on a workpiece surface, the base plate being height-adjustable on the housing, and the base plate having an opening through which the insertion tool at least partly extends, and comprising a height adjustment device for setting a working height of the base plate on the housing relative to the insertion tool.

Such a hand-held power tool in the form of a router with a height adjustment device for an insertion tool is known from the prior art. The height adjustment of the insertion tool takes place by means of so-called sacrificial wood, with the aid of which the insertion tool is arranged or set at a suitable height relative to a surface to be machined over a plurality of setting steps. Rounding cutters in particular must be set precisely such that a rounding with a specified radius on a workpiece edge to be machined can be milled completely and preferably without a shoulder.

As an alternative to the use of sacrificial wood, the setting of an intended working height of the insertion tool can be carried out with the aid of a straight object, e.g. an angle or a ruler, wherein by means of the object the cutting edge of the insertion tool is felt. Here as well, the height adjustment of the insertion tool takes place over a plurality of setting steps. Thereby, a height of the insertion tool is set iteratively, checked with an auxiliary object, e.g. a ruler, a new setting or adjustment of the height is made and checked again, and so on. This is repeated until the intended working height is set, i.e. usually until the cutting edge of the insertion tool is in contact with the auxiliary object.

SUMMARY

The present disclosure relates to a hand-held power tool, in particular a router, comprising a housing in which a drive unit for driving an insertion tool is arranged, comprising a base plate for guiding the hand-held power tool on a workpiece surface, the base plate being height-adjustable on the housing, and the base plate having an opening through which the insertion tool at least partly extends, and comprising a height adjustment device for setting a working height of the base plate on the housing relative to the insertion tool. A setting aid is provided, which allows height adjustment of a bottom of the base plate by means of the height adjustment device such that said bottom is flush with a predefined cutting edge of the insertion tool.

The disclosure thus makes it possible to provide a hand-held power tool, in particular a router, in which the setting aid makes it possible to simplify handling of the height adjustment device and thus to set the working height rapidly and precisely.

Preferably, the setting aid is cuboid or bar-shaped.

Thus, a simple and uncomplicated setting aid, which can be arranged flush on the bottom of the base plate, can be provided.

The setting aid is preferably arranged on the bottom of the base plate at least in a setting position.

Thus, the safe and reliable arrangement of the setting aid for an exact setting of the height adjustment device can be enabled.

According to one embodiment, the setting aid has a fastening section, and the base plate is provided with a receptacle on its bottom, wherein the fastening section is arranged in the receptacle in the setting position, preferably in a latching or press-fit manner.

This enables a simple and robust arrangement of the setting aid on the bottom of the base plate of the height adjustment device or in the setting position. Furthermore, this means that fixing the setting aid to the bottom of the base plate by a user of the hand-held power tool can eliminate the need for an additional fixing element, e.g. a screw clamp.

Preferably, the setting aid is pivotably arranged on the bottom of the base plate via the fastening section.

This makes it easy and uncomplicated to position the setting aid in the region of the insertion tool for a flush height adjustment of the base plate.

The base plate preferably has a receptacle on its top for receiving the fastening section in an idle position of the setting aid, in order to enable the setting aid to be arranged on the top in the idle position.

This enables the safe and reliable storage of the setting aid during a work operation of the hand-held power tool in which the setting aid is not required.

According to one embodiment, the base plate has an opening on its bottom for arranging the setting aid in a setting position and an idle position.

Thus, an alternative arrangement of the setting aid on the base plate can be made possible in a simple manner, in which the setting aid is permanently mounted on the bottom of the base plate and thus a separate manual arrangement of the setting aid on the bottom of the base plate after use by a user can be omitted.

The opening preferably has a guide track, and the setting aid preferably has at least two lateral guide pins for guiding in the guide track.

This allows the setting aid to be displaced safely and robustly from the idle position to the setting position, or vice versa.

Preferably, the setting aid is arranged in its setting position with its surface facing the insertion tool on the bottom of the base plate and in the idle position with its surface facing away from the insertion tool on the bottom of the base plate.

Thus, in a simple manner, the height adjustment of the base plate can take place in the setting position, and the machining of the workpiece surface can take place in the idle position of the setting aid.

Preferably, the setting aid is designed in the form of a slider which is arranged on the base plate in a retractable manner.

This enables the safe and reliable arrangement of the setting aid in the idle position on the bottom of the base plate.

BRIEF DESCRIPTION OF THE DRAWINGS

The disclosure is explained in more detail in the following description with reference to exemplary embodiments shown in the drawings. In the drawings.

DETAILED DESCRIPTION

In the figures, elements with the same or comparable function are given identical reference signs and described in more detail only once.

Figure 1:
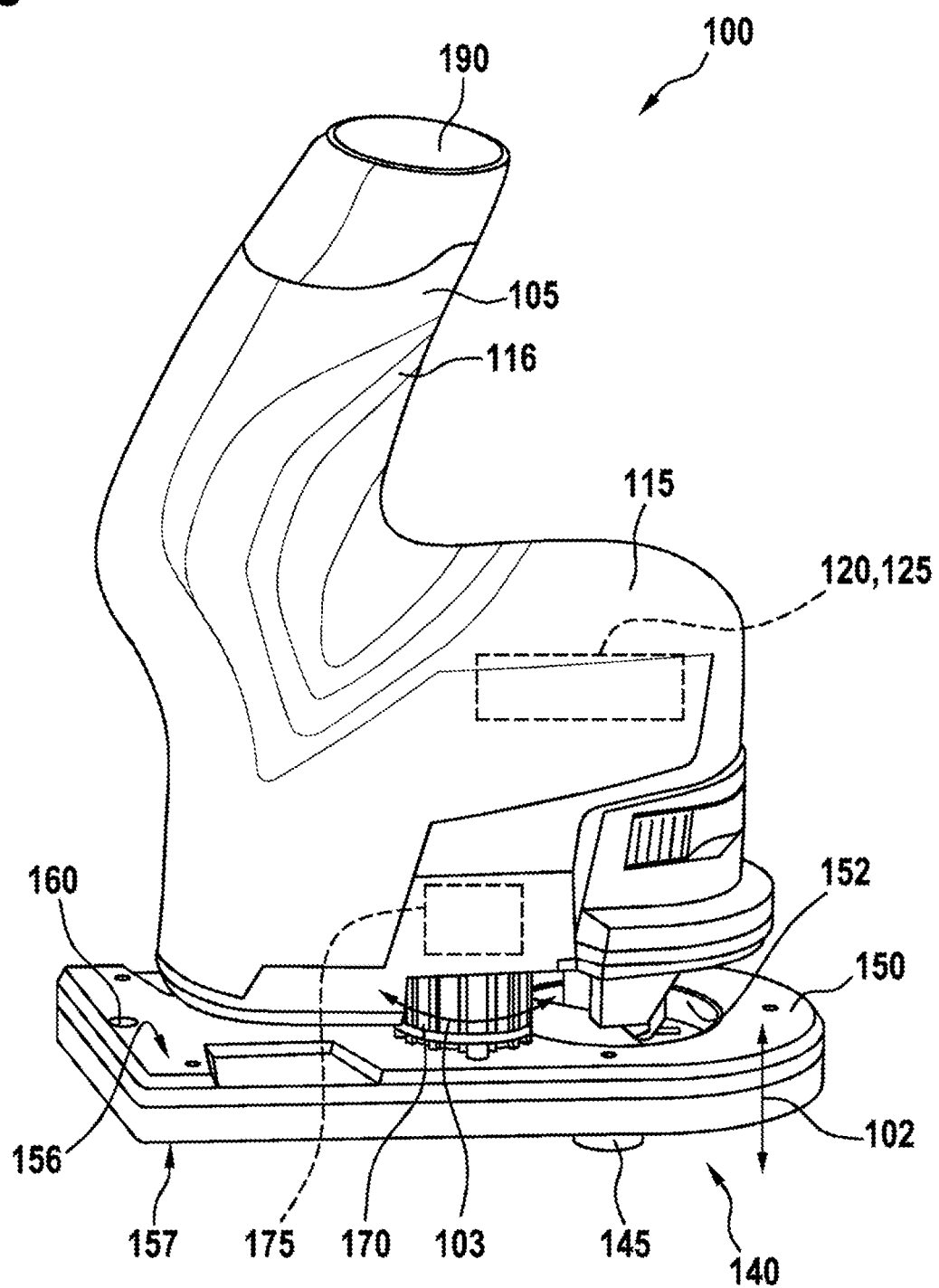
FIG. 1 is a perspective view of a hand-held power tool with a base plate and a height adjustment device for the base plate.

FIG. 1 shows a hand-held power tool 100, which is designed as a router by way of example. The hand-held power tool 100 has a housing 105 having a first housing section 115, and a second housing section 116. Preferably, a drive unit 120 is arranged in the housing 105 for driving a tool holder 140. The tool holder 140 is designed to receive an insertion tool 145. The insertion tool 145 is preferably designed as a milling tool, in particular as an edge milling cutter and/or a rounding cutter. Preferably, at least one drive motor 125 is allocated to the drive unit 120. According to one embodiment, the drive motor 125 is an electronically commutated motor.

Preferably, the drive unit 120 is arranged in the first housing section 115. Thereby, the first housing section 115 is preferably designed as a hand support surface. A battery pack 190 is preferably arranged at least partly in the second housing section 116, wherein the battery pack 190 is provided for supplying power to the hand-held power tool 100. However, it is noted that the hand-held power tool 100 can also be operable via a wired power supply, e.g. a power line. The housing sections 115, 116 are preferably integrally formed with one another.

Further, the hand-held power tool 100 preferably has a base plate 150 for guiding the hand-held power tool 100 on a workpiece surface. Preferably, the base plate 150 has an opening 152 through which the insertion tool 145 at least partly extends.

Illustratively, the hand-held power tool 100 has a height adjustment device 175. The height adjustment device 175 is preferably designed to set a working height of the base plate 150 on the housing 105 relative to the insertion tool 145. In an exemplary embodiment, the height adjustment device 175 has a control element 170. The control element 170 is preferably cylindrical in shape and rotatable in the circumferential direction 103 for setting a desired setting height of the base plate 150. Rotating the control element 170 in the circumferential direction 103 preferably moves the base plate 150 along an arrow 102, or in the vertical direction. Such a height adjustment device 175 is sufficiently known from the prior art, so for the sake of simplicity and brevity of the disclosure, a detailed description is omitted here.

Illustratively, the base plate 150 has a top 156 facing the drive unit 120, and an opposite bottom 157 facing away from the drive unit 120. According to one embodiment, a setting aid (200 in FIG. 2) is provided, which allows height adjustment of the bottom 157 of the base plate 150 by means of the height adjustment device 175 such that said bottom is flush with the insertion tool 145. The setting aid (200 in FIG. 2) is preferably arrangeable in a setting position (410 in FIG. 4), in which the height adjustment of the height adjustment device 175 takes place, and in an idle position (210 in FIG. 2), in which a work operation of the hand-held power tool 100 takes place without the setting aid (200 in FIG. 2). According to one embodiment, the base plate 150 has a receptacle 160 on its top 156 for receiving, at least in part, the setting aid (200 in FIG. 2) in the idle position (210 in FIG. 2).

Figure 2:
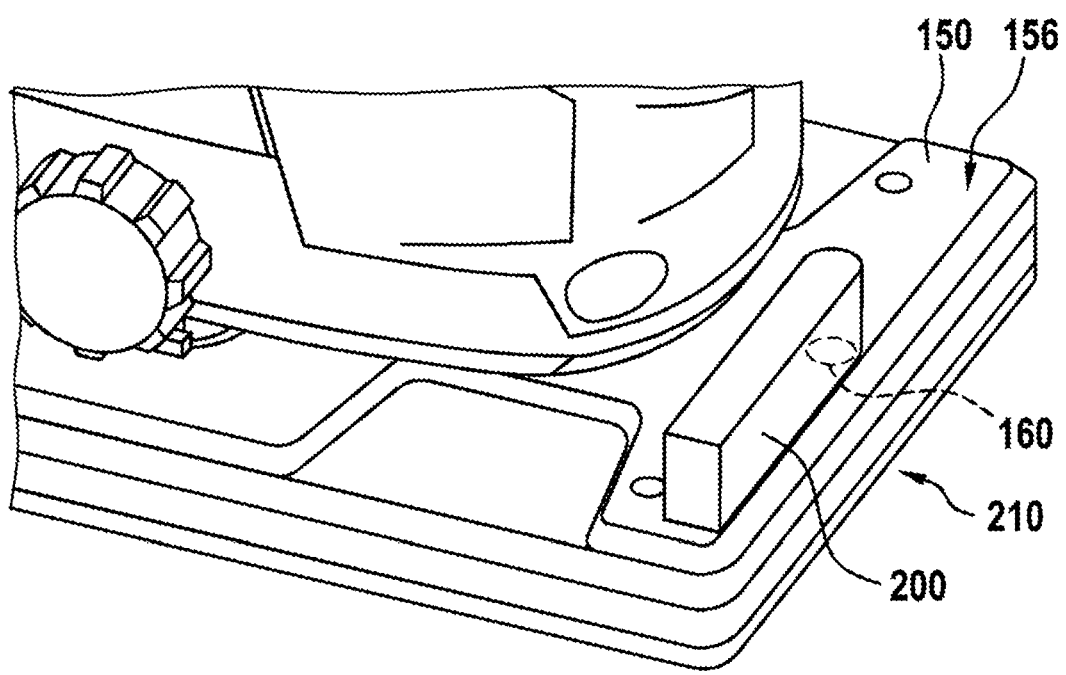
FIG. 2 is an enlarged view of the hand-held power tool with the base plate of FIG. 1 and with a setting aid in an idle position.

FIG. 2 shows the hand-held power tool 100 with the base plate 150 of FIG. 1. As described with respect to FIG. 1, according to one embodiment, a setting aid 200 is provided, which allows height adjustment of the bottom 157 of the base plate 150 by means of the height adjustment device 175 of FIG. 1 such that said bottom is flush with a predefined cutting edge (321 in FIG. 3) of the insertion tool 145. Preferably, the setting aid 200 is designed to be cuboid or bar-shaped.

In FIG. 2, the setting aid 200 is arranged in an idle position 210. According to one embodiment, the setting aid 200 is fixed in the idle position 210 in the receptacle 160 on the top 156 of the base plate 150, as an example. Thereby, the setting aid 200 is preferably fixed in the receptacle 160 via a fastening section (310 in FIG. 3) for arrangement in the idle position 210.

However, it is noted that the receptacle 160 for arranging the setting aid 200 in the idle position 210 can also be located at any position of the hand-held power tool 100 or the housing 105 and/or the base plate 150 other than that shown. In addition, a plurality of receptacles 160 may also be provided.

Figure 3:
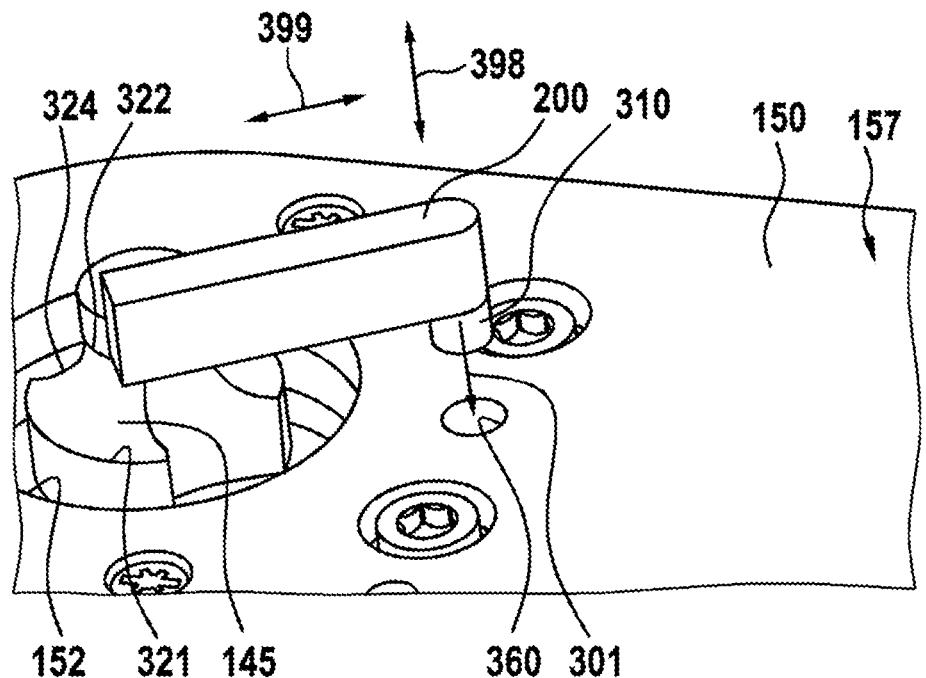
FIG. 3 is an enlarged view of the base plate of FIG. 1 and FIG. 2 viewed from a bottom, with the setting aid of FIG. 2 when arranged on the base plate.

FIG. 3 shows the base plate 150 of FIG. 1 and FIG. 2, viewed from its bottom 157. FIG. 3 shows the arrangement of the insertion tool 145, which is designed as a milling tool, in particular as a rounding cutter, in the opening 152 of the base plate 150. The hand-held power tool 100 is preferably designed for milling grooves, preferably for edge milling. Thereby, the insertion tool 145 preferably has a cutting contour 324 that connects an illustrative upper cutting edge 322 to a lower cutting edge 321.

In addition, FIG. 3 shows the setting aid 200, which has at least one fastening section 310 for arrangement on the base plate 150. Illustratively, the fastening section 310 is arranged at an axial end of the setting aid 200. The fastening section 310 is preferably formed perpendicularly or in the transverse direction 398 to a longitudinal extension 399 of the setting aid 200. Preferably, the fastening section 310 is designed to be cylindrical. However, it is noted that the fastening section 310 can also be spaced apart from an axial end of the setting aid 200.

Figure 4:
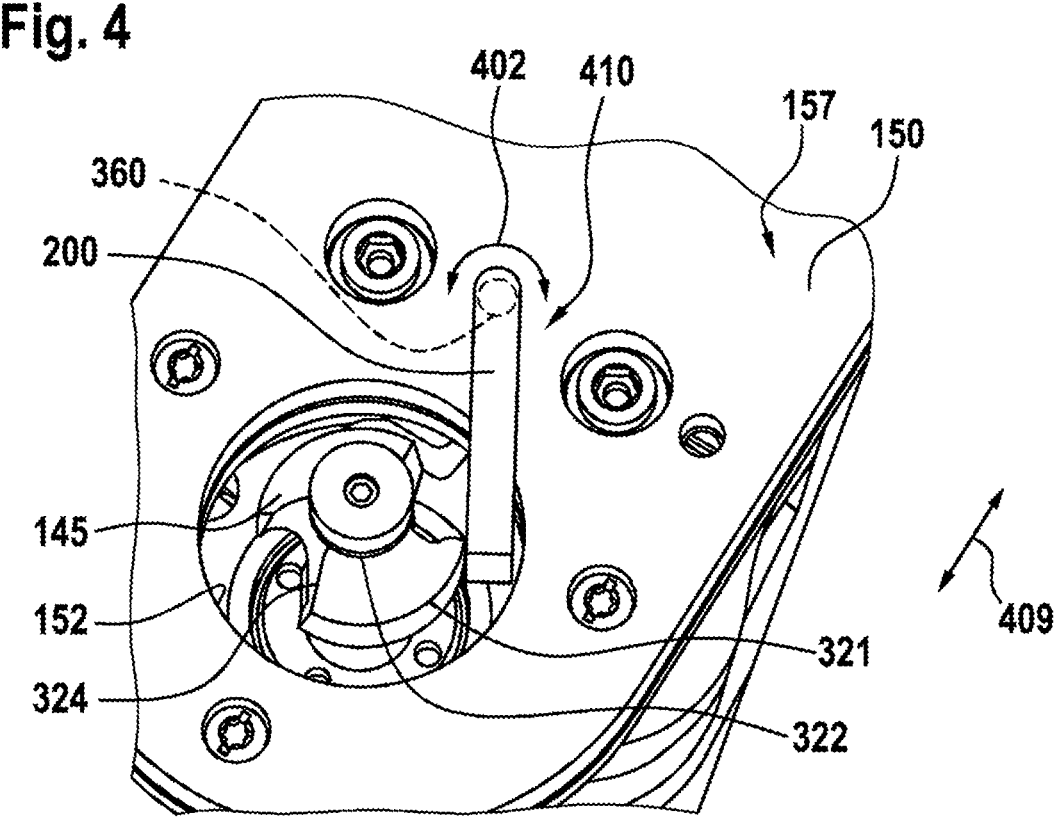
FIG. 4 is an enlarged view of the base plate of FIG. 3 with the setting aid of FIG. 2 and FIG. 3 in a setting position.

Preferably, the setting aid 200 is arranged on the bottom 157 of the base plate 150 at least in a setting position (410 in FIG. 4). To arrange the setting aid 200 in the setting position (410 in FIG. 4) on the bottom 157 of the base plate 150, the base plate 150 has at least one receptacle 360. By moving the fastening section 310 of the setting aid 200 in the transverse direction 398 of the fastening section 310 or in the direction of an arrow 301 into the receptacle 360, the setting aid 200 is fixed in the setting position (410 in FIG. 4).

It is noted that the base plate 150 can also have more than just one receptacle 360. For example, a plurality of receptacles 360 may be arranged in the region of the opening 152 of the base plate 150. In addition, the hand-held power tool 100 can also have a storage well for storing the setting aid 200.

FIG. 4 shows the base plate 150 of the hand-held power tool 100 of FIG. 1, as viewed from its bottom 157. In FIG. 4, the setting aid 200 is arranged in a setting position 410. In the setting position 410, the fastening section 310 of FIG. 3 of the setting aid 200 is preferably arranged in the receptacle 360 of FIG. 3 of the base plate 150. The fastening section 310 of FIG. 3 is preferably arranged in a latching or press-fit manner in the receptacle 360. The setting aid 200 is preferably pivotally arranged on the bottom 157 of the base plate 150 via the fastening section 310 in the circumferential direction 402 of the fastening section 310 of FIG. 3.

The receptacle 360 is preferably arranged on the bottom 157 of the base plate 150 in such a manner that the setting aid 200 at least partly covers the opening 152 of the base plate 150 along a longitudinal extension 409 of the base plate 150.

Figure 5:
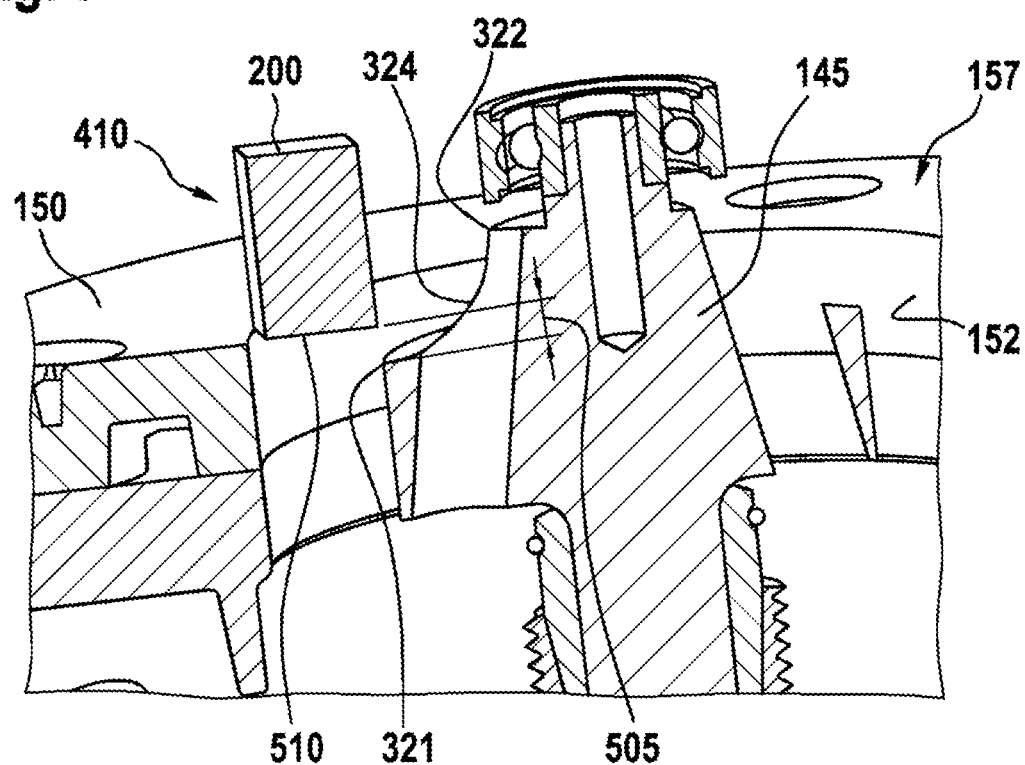
FIG. 5 is a sectional view of the base plate with the setting aid of FIG. 3, wherein the base plate is arranged in a first position relative to an insertion tool.

FIG. 5 shows the base plate 150 of the hand-held power tool 100 of FIG. 4 with the setting aid 200 in the setting position 410, and with the insertion tool 145. A surface 510 of the setting aid 200 facing the insertion tool 145 is arranged on the bottom 157 of the base plate 150.

In FIG. 5, the illustrative lower cutting edge 321 of the insertion tool 145 is positioned at an exemplary spacing 505 from the bottom 157 of the base plate 150, or from the surface 510 of the setting aid 200. Due to the spacing 505 shown in FIG. 5, a milling operation would result in an insufficiently formed radius, e.g. one that is too small or formed with a shoulder. To prevent this, an exact setting, or a flush height adjustment of the illustrative lower cutting edge 321 via the height adjustment device 175 with the control element 170 of FIG. 1 is required.

Figure 6:
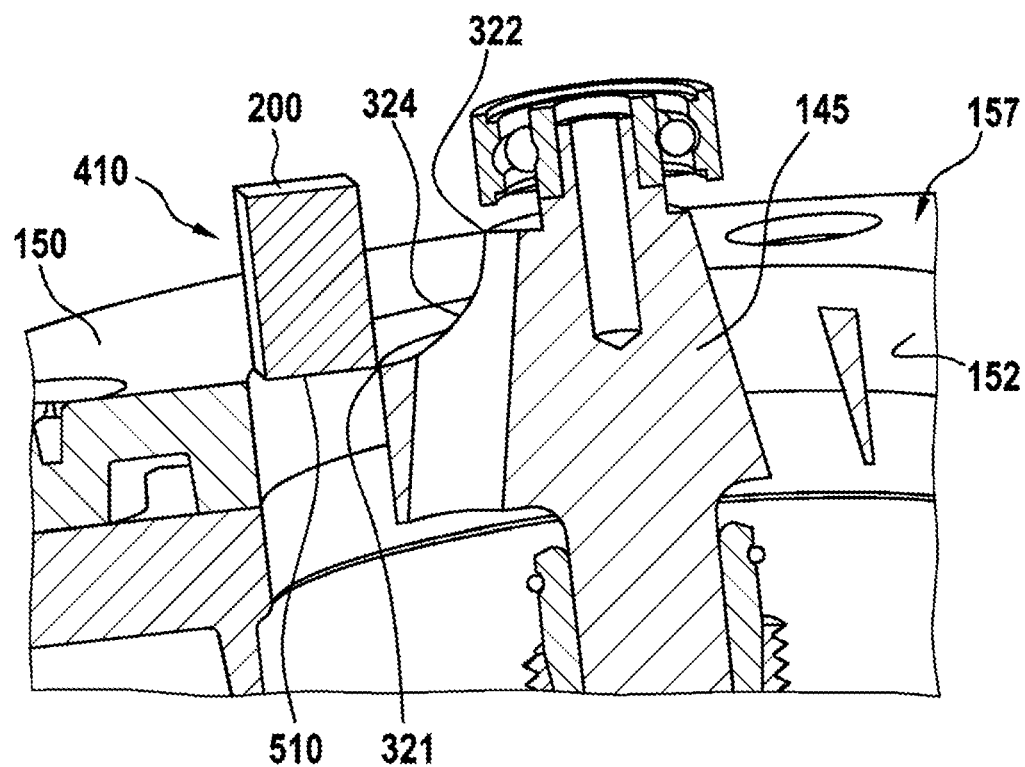
FIG. 6 is a sectional view of the base plate with the setting aid of FIG. 4, wherein the base plate is arranged in a second position relative to the insertion tool.

FIG. 6 shows the base plate 150 with the setting aid 200 in the setting position 410, and with the insertion tool 145 according to FIG. 5, wherein the insertion tool 145 is arranged in a provided, precisely set machining position. In this machining position of the insertion tool 145, the illustrative lower cutting edge 321 is preferably flush with the surface 510 of the setting aid 200, or the bottom 157 of the base plate 150. For this purpose, the height adjustment device 175 was preferably operated until the cutting edge 321 abuts the surface 510 of the setting aid 200.

Figure 7:
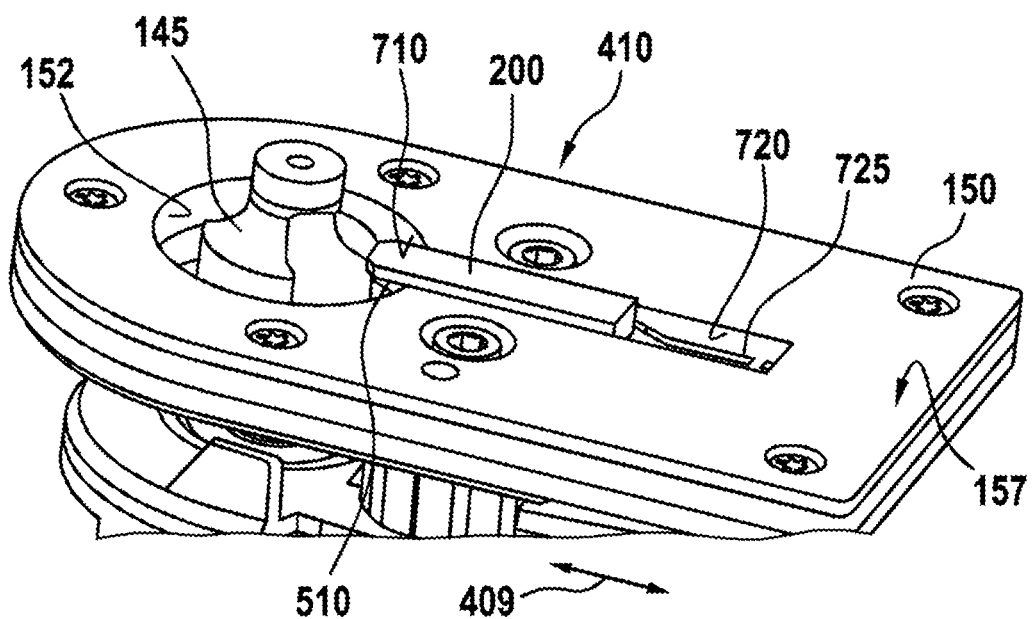
FIG. 7 is a perspective view of the base plate of FIG. 1 viewed from a bottom, with an alternative setting aid in a setting position.

FIG. 7 shows the hand-held power tool 100 of FIG. 1 with the base plate 150, along with the setting aid 200 of FIG. 2 designed according to a further embodiment. In the embodiment shown in FIG. 7, the base plate 150 has an opening 720 on its bottom 157 for arranging the setting aid 200 in the setting position 410 and an idle position. In FIG. 7, the setting aid 200 is arranged in the setting position 410.

According to the embodiment of FIG. 7, the setting aid 200 is designed in the manner of a slider and is therefore also referred to below as the "slider 200." The slider 200 is preferably retractably arranged on the base plate 150. Illustratively, the slider 200 is displaceable along the longitudinal extension 409 of the base plate 150. In the setting position 410, the slider 200 preferably projects into the opening 152 of the base plate 150 in the radial direction of the opening 152.

Preferably, the opening 720 has a guide track 725 in which the slider 200 is displaceable. In the setting position 410, the slider 200 is arranged with its surface 510 facing the insertion tool 145 on the bottom 157 of the base plate 150. In the idle position, the slider 200 is preferably arranged with its surface 710 facing away from the insertion tool 145 on the bottom 157 of the base plate 150. Thereby, the slider 200 is preferably arranged outside the opening 152 of the base plate 150 in the idle position, such that the insertion tool 145 can perform the machining.

Figure 8:
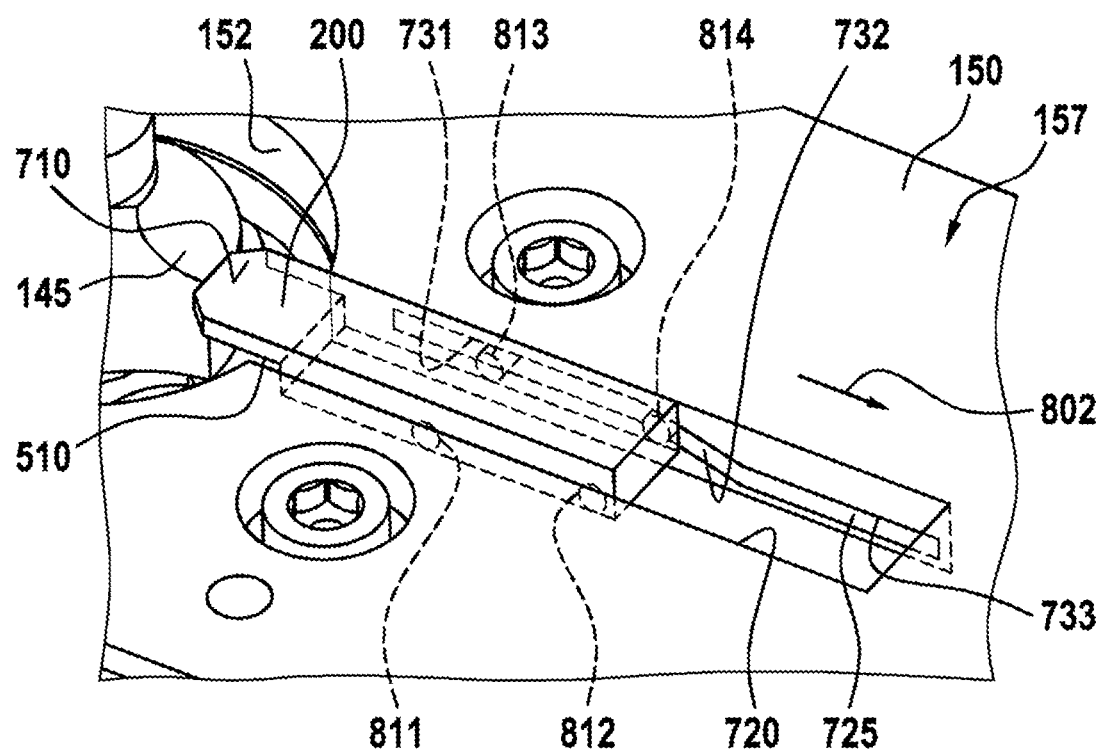
FIG. 8 is an enlarged view of the base plate with the setting aid of FIG. 7.

FIG. 8 shows the base plate 150 with the setting aid 200, along with the insertion tool 145 of FIG. 7, and illustrates the guide track 725 of the opening 720. In its setting position 410, the slider 200 is arranged with its surface 510 facing the insertion tool 145 on the bottom 157 of the base plate 150, and in its idle position the slider 200 is arranged with its surface 710 facing away from the insertion tool 145 on the bottom 157 of the base plate 150. For this purpose, the guide track 725 preferably has an illustrative left first section 731 for arranging the slider 200 in the setting position 410, and an illustrative right second section 733 for arranging the slider 200 in the idle position. In the setting position 410, the slider 200 is arranged in the first section 731, in which the surface 510 of the slider 200 is arranged flush with the bottom 157 of the base plate 150. In the idle position, the slider 200 is arranged in the second section 733, in which the surface 710 of the slider 200 is arranged flush with the bottom 157 of the base plate 150. The two sections 731, 733 of the guide track 725 are preferably connected by a bevel 732.

For guiding in the guide track 725, the slider 200 has at least two lateral guide pins 811, 812, 813, 814. To arrange the slider 200 in the idle position, the slider 200 is displaced illustratively to the right in the direction of an arrow 802 in the guide track 725. It is noted that the base plate 150 can also be designed in such a manner that the slider 200 of FIG. 7 and FIG. 8 can also be moved from the setting position to the idle position via turning/rotation in a guide track of the base plate 150.

What is claimed is:

1. A hand-held power tool, comprising:
   a drive unit configured to drive an insertion tool;
   a housing in which the drive unit is arranged;
   a base plate configured to guide the hand-held power tool on a workpiece surface, the base plate being height-adjustable on the housing, and the base plate having an opening through which the insertion tool can at least partly extend;
   a height adjustment device configured to adjust a working height of the base plate on the housing relative to the insertion tool; and
   a setting aid configured to facilitate a height adjustment of a bottom of the base plate by way of the height adjustment device such that said bottom is flush with a predefined cutting edge of the insertion tool,
   wherein:
   the setting aid is arranged on the bottom of the base plate at least in a setting position, in which setting position of the setting aid, the height adjustment is able to take place,
   the setting aid has a fastening section,
   the bottom of the base plate includes a receptacle,
   the fastening section is arranged in the receptacle when the setting aid is in the setting position, and
   the setting aid is pivotally arranged on the bottom of the base plate via the fastening section.

2. The hand-held power tool according to claim 1, wherein the setting aid is cuboid or bar-shaped.

3. The hand-held power tool according to claim 1 wherein the base plate has a top that includes a second receptacle configured to receive the fastening section when the setting aid is in an idle position in order to enable the setting aid to be arranged on the top when the setting aid is in the idle position.

4. The hand-held power tool according to claim 1, wherein the receptacle on the bottom of the base plate is an opening on the bottom which is configured to arrange the setting aid when the setting aid is in the setting position.

5. The hand-held power tool according to claim 1, wherein the hand-held power tool is a router.

6. The hand-held power tool according to claim 1, wherein the fastening section is arranged in the receptacle in a latching or press-fit manner when the setting aid is in the setting position.

\* \* \* \* \*